US012713436B2

(12) United States Patent
Cheng et al.

(10) Patent No.: US 12,713,436 B2
(45) Date of Patent: Aug. 18, 2026

(54) METHODS AND APPARATUS FOR USER EQUIPMENT-ANTICIPATED COMMON BEAM SWITCHING

(71) Applicant: Huawei Technologies Co., Ltd., Shenzhen (CN)

(72) Inventors: Qian Cheng, Naperville, IL (US); Weimin Xiao, Hoffman Estates, IL (US); Jialing Liu, Palatine, IL (US); Zhigang Rong, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 18/164,083

(22) Filed: Feb. 3, 2023

(65) Prior Publication Data

US 2023/0189284 A1 Jun. 15, 2023

Related U.S. Application Data

(63) Continuation of application No. PCT/US2020/045267, filed on Aug. 6, 2020.

(51) Int. Cl.

| | |
|---|---|
| ***H04W 72/23*** | (2023.01) |
| ***H04L 5/00*** | (2006.01) |
| ***H04W 24/10*** | (2009.01) |
| ***H04W 72/1273*** | (2023.01) |

(52) U.S. Cl.

CPC ........... *H04W 72/23* (2023.01); *H04L 5/0051* (2013.01); *H04W 24/10* (2013.01); *H04W 72/1273* (2013.01)

(58) Field of Classification Search

None

See application file for complete search history.

(56) References Cited

U.S. PATENT DOCUMENTS

| | | | | |
|---|---|---|---|---|
| 10,972,952 | B2 * | 4/2021 | Tsai | H04W 24/10 |
| 2020/0120584 | A1 * | 4/2020 | Yi | H04W 48/16 |
| 2021/0185651 | A1 * | 6/2021 | Seo | H04W 24/08 |
| 2022/0159733 | A1 * | 5/2022 | Cirik | H04L 5/0053 |
| 2023/0362968 | A1 * | 11/2023 | Xi | H04W 72/046 |

FOREIGN PATENT DOCUMENTS

| | | | | |
|---|---|---|---|---|
| CN | 111357362 A | | 6/2020 | |
| WO | WO-2018129300 A1 | * | 7/2018 | H04W 56/001 |
| WO | WO-2019099659 A1 | * | 5/2019 | H04B 7/02 |

OTHER PUBLICATIONS

Qualcomm Incorporated, "Remaining Details on QCL", 3GPP TSG RAN WG1 Meeting AH 1801, R1-1800867, Jan. 22-26, 2018, 8 Pages, Vancouver, Canada.

* cited by examiner

*Primary Examiner* — Luna Weissberger

(74) *Attorney, Agent, or Firm* — Slater Matsil, LLP

(57) ABSTRACT

A method for user equipment-anticipated common beam switching includes receiving, by a user equipment (UE), a set of reference signals from a network controller; sending, by the UE, a measurement report to the network controller based on a first reference signal of the received reference signals; determining, by the UE, that a quantity of the first reference signal reported in the measurement report exceeds a threshold; and based thereon monitoring, by the UE, a physical downlink control channel (PDCCH) over a search space on a first control resource set (CORESET), a spatial quasi-colocation (QCL) field in a transmission configuration indication (TCI) state of the first CORESET being set to a resource index of the first reference signal.

20 Claims, 5 Drawing Sheets

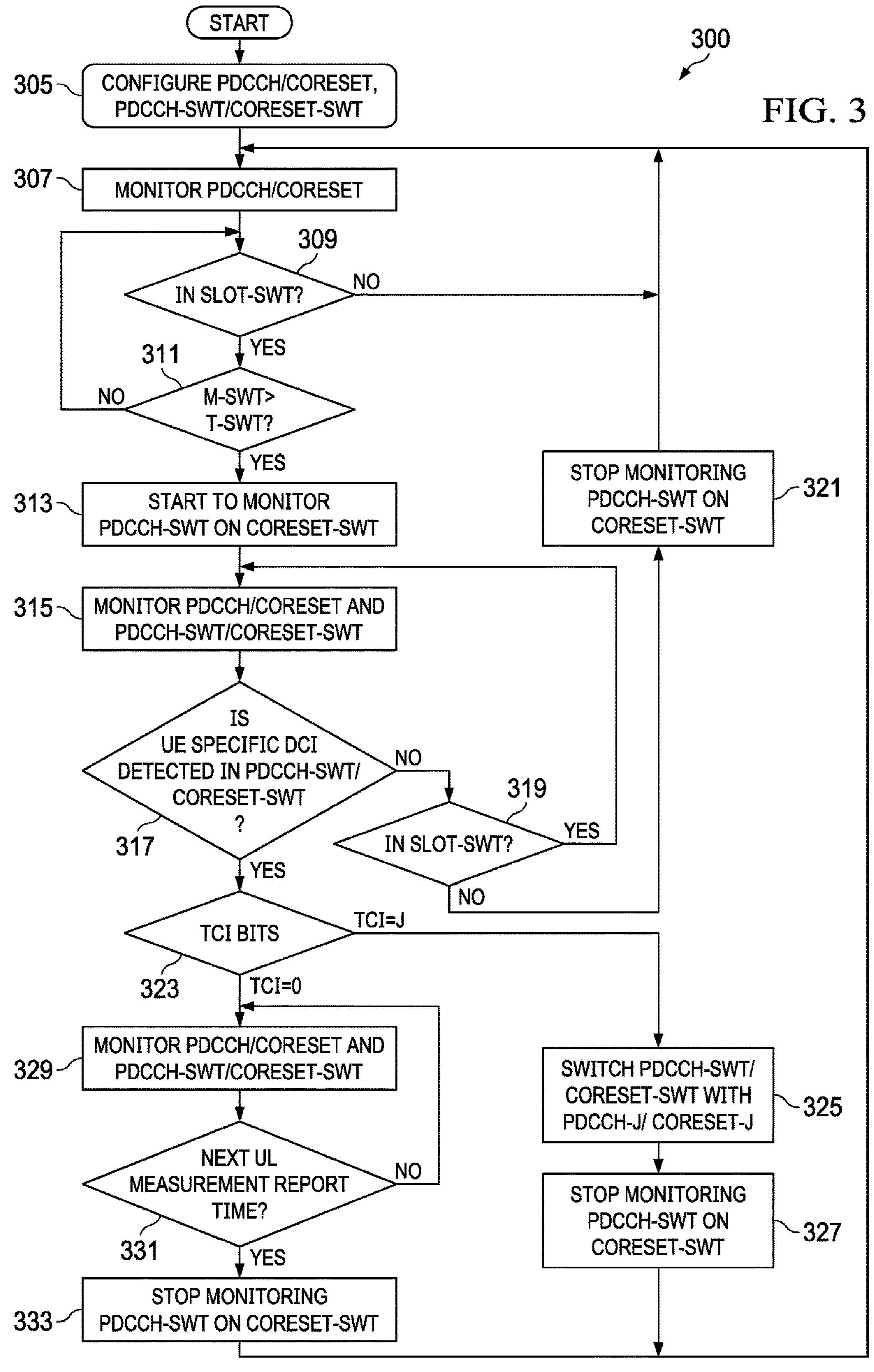
START
300
FIG. 3
305
CONFIGURE PDCCH/CORESET, PDCCH-SWT/CORESET-SWT
307
MONITOR PDCCH/CORESET
309
IN SLOT-SWT?
NO
YES
311
M-SWT> T-SWT?
NO
YES
313
START TO MONITOR PDCCH-SWT ON CORESET-SWT
STOP MONITORING PDCCH-SWT ON CORESET-SWT
321
315
MONITOR PDCCH/CORESET AND PDCCH-SWT/CORESET-SWT
IS UE SPECIFIC DCI DETECTED IN PDCCH-SWT/ CORESET-SWT ?
317
NO
319
IN SLOT-SWT?
YES
NO
YES
TCI BITS
323
TCI=J
TCI=0
329
MONITOR PDCCH/CORESET AND PDCCH-SWT/CORESET-SWT
SWITCH PDCCH-SWT/ CORESET-SWT WITH PDCCH-J/ CORESET-J
325
NEXT UL MEASUREMENT REPORT TIME?
NO
331
YES
STOP MONITORING PDCCH-SWT ON CORESET-SWT
327
333
STOP MONITORING PDCCH-SWT ON CORESET-SWT

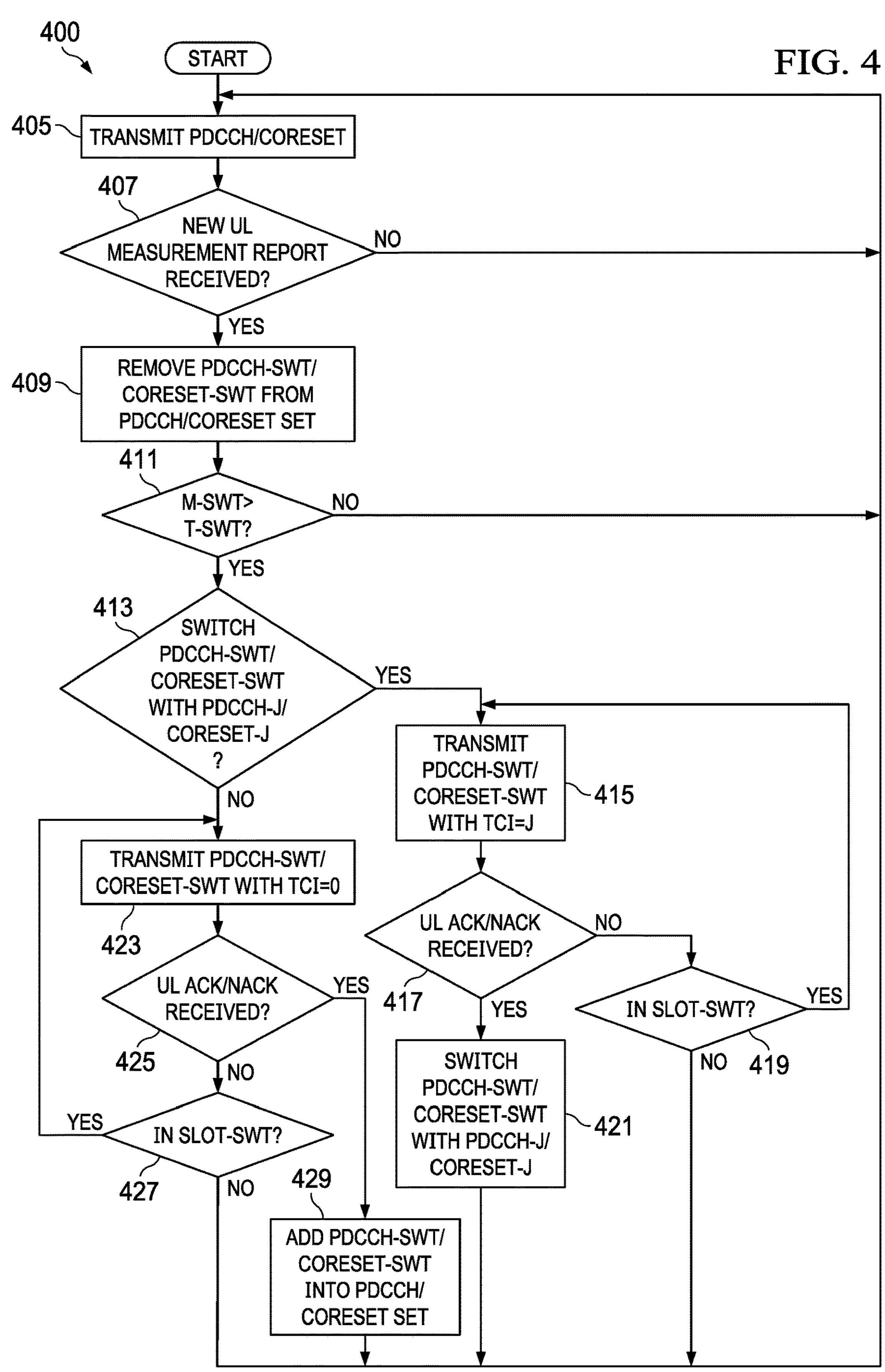

400
START
FIG. 4
405
TRANSMIT PDCCH/CORESET
407
NEW UL MEASUREMENT REPORT RECEIVED?
NO
YES
409
REMOVE PDCCH-SWT/ CORESET-SWT FROM PDCCH/CORESET SET
411
M-SWT> T-SWT?
NO
YES
413
SWITCH PDCCH-SWT/ CORESET-SWT WITH PDCCH-J/ CORESET-J ?
YES
NO
TRANSMIT PDCCH-SWT/ CORESET-SWT WITH TCI=J
415
TRANSMIT PDCCH-SWT/ CORESET-SWT WITH TCI=0
423
UL ACK/NACK RECEIVED?
NO
417
YES
UL ACK/NACK RECEIVED?
YES
425
NO
IN SLOT-SWT?
YES
NO
419
SWITCH PDCCH-SWT/ CORESET-SWT WITH PDCCH-J/ CORESET-J
421
YES
IN SLOT-SWT?
427
NO
429
ADD PDCCH-SWT/ CORESET-SWT INTO PDCCH/ CORESET SET

610a
ED
600
640
670a
BASE STATION
620a
PSTN
690
630
660
CORE NETWORK
OTHER NETWORKS
ED
610b
670b
BASE STATION
620b
INTERNET
ED
610c
650

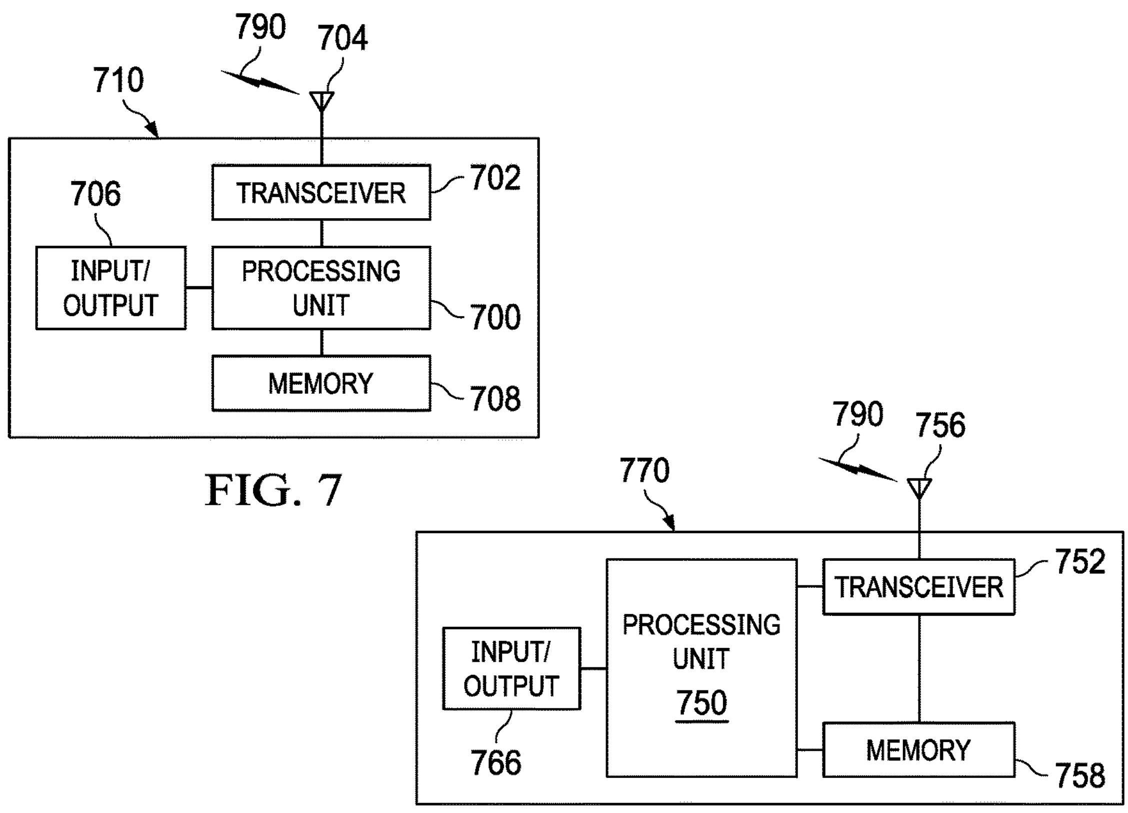
FIG. 7
FIG. 8
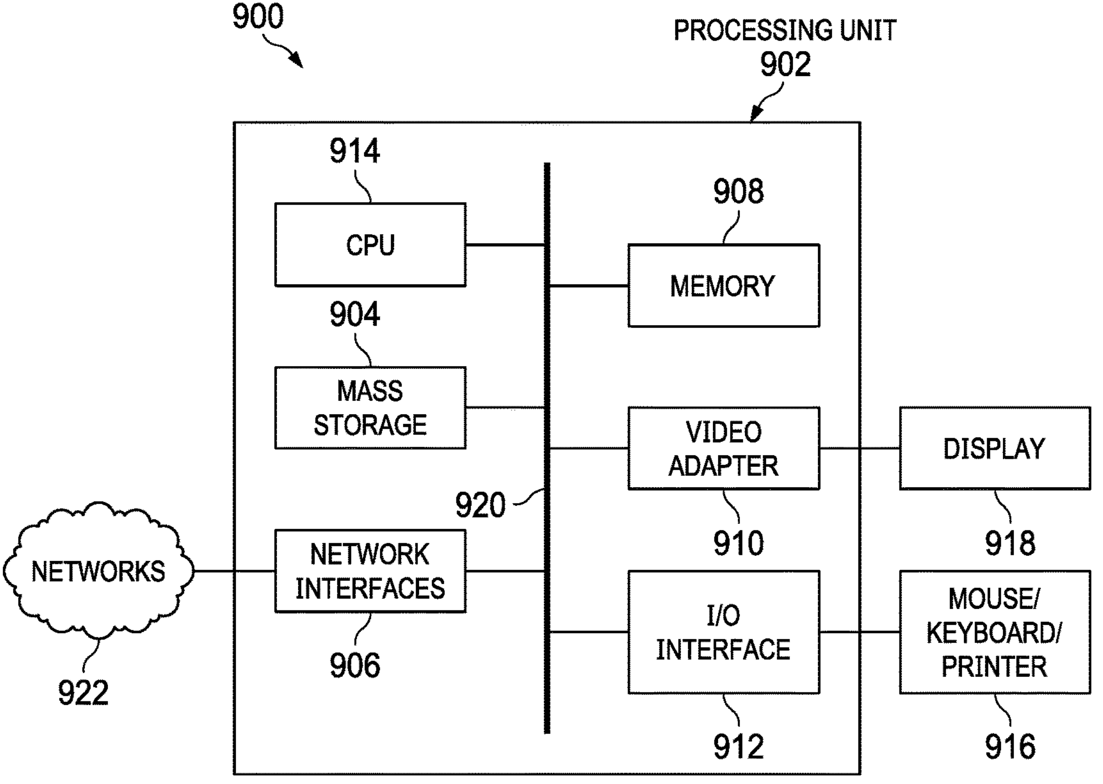
FIG. 9

METHODS AND APPARATUS FOR USER EQUIPMENT-ANTICIPATED COMMON BEAM SWITCHING

CROSS-REFERENCE TO RELATED APPLICATIONS

This application is a continuation of International Application No. PCT/US2020/045267, filed Aug. 6, 2020, and entitled "Methods and Apparatus for User Equipment-Anticipated Common Beam Switching," application of which is incorporated herein by reference.

TECHNICAL FIELD

The present disclosure relates generally to methods and apparatus for digital communications, and, in particular embodiments, to methods and apparatus for user equipment-anticipated common beam switching.

BACKGROUND

One possible deployment scenario for fifth generation (5G) New Radio (NR) system architecture uses high frequency (HF) (6 gigahertz (GHz) and above) operating frequencies to exploit greater available bandwidth, and reduced interference than what is available at lower frequencies. Beamforming is often used to overcome path loss issues associated with the use of higher frequencies. A frequent deployment scenario uses a common beam for downlink control channel and downlink data channel transmissions between a user equipment (UE) and a mobile network. Often the uplink control and data may utilize a correspondence beam of the common downlink beam. Beam management procedures are used to update transmission configuration states associated with the uplink/downlink transmissions.

Therefore, there is a need for systems and methods for more efficient beam management for situations in which a common beam is used for uplink and/or downlink data and control transmissions.

SUMMARY

Example embodiments provide a system and apparatus for user equipment-anticipated common beam switching.

In accordance with an example embodiment, a computer-implemented method for user equipment-anticipated common beam switching is provided. The method includes receiving, by a user equipment (UE), a set of reference signals from a network controller, sending, by the UE, a measurement report to the network controller based on a first reference signal of the received reference signals, determining, by the UE, that a quantity of the first reference signal reported in the measurement report exceeds a threshold, and based thereon monitoring, by the UE, a physical downlink control channel (PDCCH) over a search space on a first control resource set (CORESET), a spatial quasi-colocation (QCL) field in a transmission configuration indication (TCI) state of the first CORESET being set to a resource index of the first reference signal.

Optionally, in any of the preceding embodiments, an embodiment further includes detecting, by the UE, a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

Optionally, in any of the preceding embodiments, an embodiment further includes wherein the UE stops monitoring the PDCCH over the search space on the first CORESET responsive to the UE failing to detect a DCI message within a number of slots.

Optionally, in any of the preceding embodiments, an embodiment further includes detecting, by the UE, a TCI bits field in a DCI message in the PDCCH on the first CORESET, the TCI bits field instructing the UE to replace a spatial QCL field in a TCI state of a second CORESET with the spatial QCL field in the TCI state of the first CORESET, and replacing, by the UE in response to receiving the TCI bits field in the DCI message, the spatial QCL field in the TCI state of the second CORESET with the spatial QCL field of the TCI state of the first CORESET.

Optionally, in any of the preceding embodiments, an embodiment further includes monitoring, by the UE, the PDCCH over the search space on the first CORESET, a demodulation reference signal (DMRS) of the PDCCH being quasi-co-located with respect to receive (RX) spatial parameters of the first reference signal.

Optionally, in any of the preceding embodiments, an embodiment further includes detecting, by the UE, a DCI message in the PDCCH over the search space on the first CORESET, the DCI message instructing the UE to receive a PDSCH, a DMRS of the PDSCH being quasi-co-located (QCL) with respect to RX spatial parameters of the first reference signal.

Optionally, in any of the preceding embodiments, an embodiment further includes wherein the UE is initially configured with the first CORESET without the spatial QCL field being set, and the UE not being configured to monitor the PDCCH over the search space on the first CORESET.

Optionally, in any of the preceding embodiments, an embodiment further includes wherein the UE is initially configured with the first CORESET with the spatial QCL field set to a NULL value, and the UE not being configured to monitor the PDCCH over the search space on the first CORESET.

Optionally, in any of the preceding embodiments, an embodiment further includes wherein a threshold value associated with the threshold is predefined.

Optionally, in any of the preceding embodiments, an embodiment further includes wherein the threshold is configured through a radio resource control (RRC) message.

Optionally, in any of the preceding embodiments, an embodiment further includes wherein the threshold is updated through a medium access control-control element (MAC-CE) message.

Optionally, in any of the preceding embodiments, an embodiment further includes wherein the UE is configured to monitor the PDCCH over the search space on the first CORESET, the spatial QCL field in the TCI state of the first CORESET being set to the resource index of the first reference signal.

Optionally, in any of the preceding embodiments, an embodiment further includes wherein the threshold is not configured, and the UE is configured to monitor the PDCCH over the search space on the first CORESET, a demodulation reference signal (DMRS) of the PDCCH being quasi-co-located with respect to spatial QCL information of the first reference signal.

Optionally, in any of the preceding embodiments, an embodiment further includes wherein the number of slots is predefined.

Optionally, in any of the preceding embodiments, an embodiment further includes wherein the number of slots is configured through a RRC message.

Optionally, in any of the preceding embodiments, an embodiment further includes wherein the number of slots is updated through a MAC-CE message.

Optionally, in any of the preceding embodiments, an embodiment further includes wherein the threshold used to compare to the quantity in the measurement report is a Reference Signal Receive Power (RSRP).

Optionally, in any of the preceding embodiments, an embodiment further includes wherein the threshold used to compare to the quantity in the measurement report is a Signal to Interference plus Noise Ratio (SINR).

In accordance with another embodiment, a UE is provided. The UE includes a non-transitory memory storage comprising instructions, and one or more processors in communication with the memory storage. The one or more processors execute instructions to receive a set of reference signals from a network controller, send a measurement report to the network controller based on a first reference signal of the received reference signals, determine that a quantity of the first reference signal reported in the measurement report exceeds a threshold, and based thereon monitor a physical downlink control channel (PDCCH) over a search space on a first control resource set (CORESET), a spatial quasi-colocation (QCL) field in a transmission configuration indication (TCI) state of the first CORESET being set to a resource index of the first reference signal.

Optionally, in any of the preceding embodiments, an embodiment wherein the one or more processors further execute the instructions to detect a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

Optionally, in any of the preceding embodiments, an embodiment wherein the one or more processors further execute the instructions to stop monitoring the PDCCH over the search space on the first CORESET responsive to the UE failing to detect a DCI message within a number of slots.

Optionally, in any of the preceding embodiments, an embodiment wherein the one or more processors further execute the instructions to detect a TCI bits field in a DCI message in the PDCCH on the first CORESET, the TCI bits field instructing the UE to replace a spatial QCL field in a TCI state of a second CORESET with the spatial QCL field in the TCI state of the first CORESET, and replace, in response to receiving the TCI bits field in the DCI message, the spatial QCL field in the TCI state of the second CORESET with the spatial QCL field of the TCI state of the first CORESET.

Optionally, in any of the preceding embodiments, an embodiment wherein the one or more processors further execute instructions to monitor the PDCCH over the search space on the first CORESET, a demodulation reference signal (DMRS) of the PDCCH being quasi-co-located with respect to receive (RX) spatial parameters of the first reference signal.

Optionally, in any of the preceding embodiments, an embodiment wherein the one or more processors further executing instructions to detect, a DCI message in the PDCCH over the search space on the first CORESET, the DCI message instructing the UE to receive a PDSCH, a DMRS of the PDSCH being quasi-co-located (QCL) with respect to RX spatial parameters of the first reference signal.

In accordance with another embodiment, a non-transitory computer-readable media storing computer instructions is provided. The computer instructions when executed by one or more processors, cause the one or more processors to perform the steps of receiving, by a user equipment (UE), a set of reference signals from a network controller, sending, by the UE, a measurement report to the network controller based on a first reference signal of the received reference signals, determining, by the UE, that a quantity of the first reference signal reported in the measurement report exceeds a threshold, and based thereon monitoring, by the UE, a physical downlink control channel (PDCCH) over a search space on a first control resource set (CORESET), a spatial quasi-colocation (QCL) field in a transmission configuration indication (TCI) state of the first CORESET being set to a resource index of the first reference signal.

Optionally, in any of the preceding embodiments, an embodiment wherein the computer instructions cause the processor to perform the step of detecting, by the UE, a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

Optionally, in any of the preceding embodiments, an embodiment wherein the computer instructions cause the processor to perform the steps of detecting, by the UE, a TCI bits field in a DCI message in the PDCCH on the first CORESET, the TCI bits field instructing the UE to replace a spatial QCL field in a TCI state of a second CORESET with the spatial QCL field in the TCI state of the first CORESET, and replacing, by the UE in response to receiving the TCI bits field in the DCI message, the spatial QCL field in the TCI state of the second CORESET with the spatial QCL field of the TCI state of the first CORESET.

Practice of the foregoing embodiments enables a communication device, such as a UE, to anticipate switching of a common beam used for uplink and/or downlink data and control transmissions to facilitate more efficient downlink/uplink beam management (e.g., lower latency and/or overhead) to support higher intra- and layer 1/layer 2-centric inter-cell mobility and/or a larger number of configured TCI states.

Practice of the foregoing embodiments provide an enhanced signaling mechanism for multi-beam operation to improve latency and efficiency by utilizing increased dynamic control signaling to signal beam switching as opposed to relying on the use of RRC signaling.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a flow diagram of first example operations occurring in a UE for UE-anticipated common beam switching according to example embodiments described herein;

FIG. 4 illustrates a flow diagram of example operations occurring in a base station for UE-anticipated common beam switching according to example embodiments described herein.

FIG. 7 illustrates an example device that may implement the methods and teachings according to this disclosure;

FIG. 8 illustrates another example device that may implement the methods and teachings according to this disclosure; and FIG. 9 is a block diagram of a computer system that may be used for implementing the devices and methods disclosed herein.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Existing beam management procedures lack efficient support for common beam switching during some deployment scenarios, such as high mobility scenarios, in which a large number of transmission configuration states may be configured in a situation. Examples of high-speed deployment scenarios include vehicular speeds up to 80 miles per hour (mph) while travelling on highways, high speed train speeds up to 160 mph. Existing beam signaling procedures are too slow to signal common beam switching in these scenarios.

Figure 1:
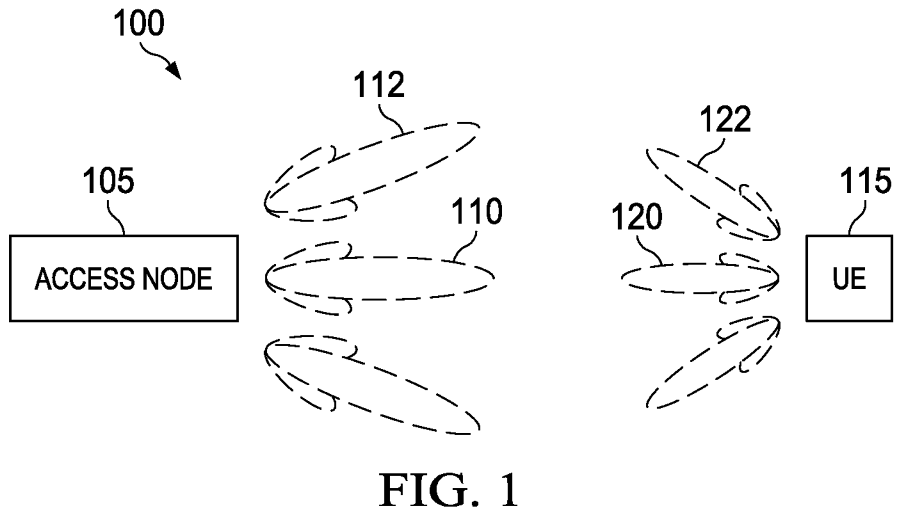
FIG. 1 illustrates an example wireless communications system.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node and one UE are illustrated for simplicity.

As discussed previously, path loss in communications systems operating at high frequency (HF) (6 gigahertz (GHz) and above, such as millimeter wavelength (mmWave)) operating frequencies is high, and beamforming may be used to overcome the high path loss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Figure 2:
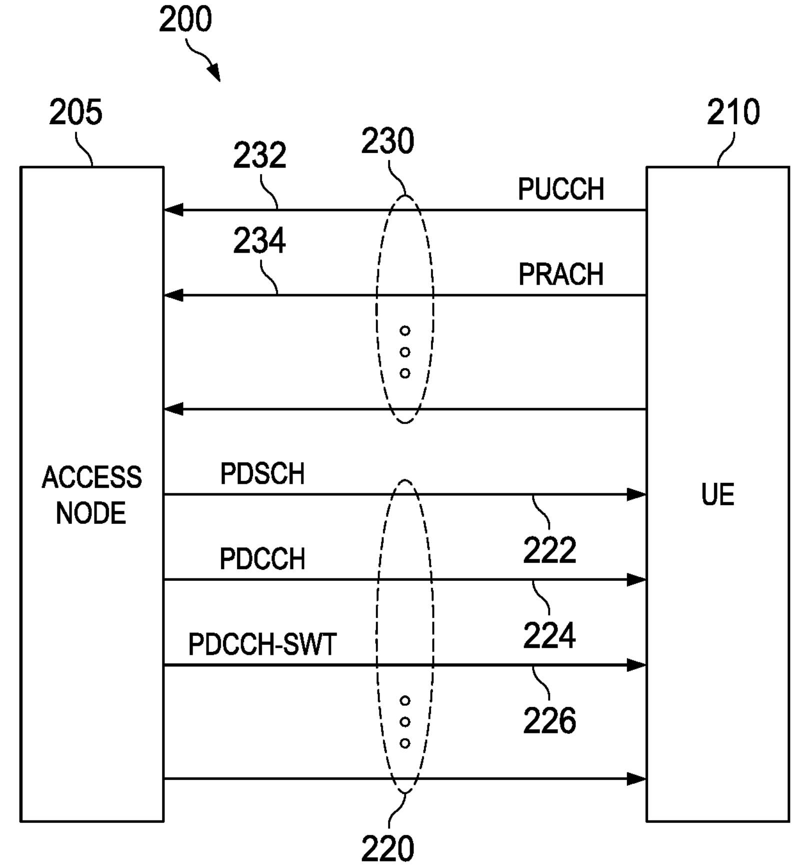
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222, a first physical downlink control channel (PDCCH) 224, and a second physical downlink control channel (PDCCH-SWT) 226 among others. The second physical downlink control channel (PDCCH-SWT) is also referred to herein as a switching PDCCH. Uplink channel 230 includes a physical uplink control channel (PUCCH) 232 and a physical random access channel (PRACH) 234 among others. Other channels may be present in downlink channel 220 or uplink channel 230 but are not shown in FIG. 2.

In existing beam indication frameworks, downlink control information (DCI) messages and medium access control-control element (MAC-CE) messages provide fast layer 1 (L1) and layer 2 (L2) signaling to handle intra-cell mobility, while Radio Resource Control (RRC) messages provide slow higher layer signaling to handle inter-cell mobility. For example, for a downlink transmission configuration indicator (TCI) state an RRC message provides relatively slow signaling and may take on the order of hundreds of milliseconds (ms). A MAC-CE message may be used to activate and update some TCI states in approximately 10 ms. Similarly, an RRC may take hundreds of milliseconds to configure uplink spatial relations, and a MAC-CE may activate and update uplink spatial relations in approximately 10 ms. Examples of Existing Beam Signaling Includes:

- PDCCH:
  - RRC configures up to 64 TCI states
  - MAC-CE activates 1 TCI state for each CORESET
- PDSCH:
  - RRC configures up to 128 TCI states
  - MAC-CE activates up to 8 TCI states
  - 3 bits in DCI to indicate one of the 8 TCI states

CSI-RS:

P-CSI-RS/TRS: RRC configure resource and TCI states, RRC activates

AP-CSI-RS" RRC configures resource and TCI states, MAC-CE activates, DCI triggers AP-TRS: QCL to a P-TRS, MAC-CE activates, DCI triggers SP-CSI-RS/CSI-IM: RRC configures resource, MAC-CE configures TCI states, MAC-CE activates

PUCCH:

RRC configures up to 8 spatial relations

MAC-CE activates one spatial relation for a PUCC resource 3 bits PUCCH resource indicator in DCI indicate which PUCCH resource to transmit UCI

PUSCH:

SRS resource indicator in DCI indicates the spatial relations to SRS

SRS

P-SRS: RRC configures resource and spatial relation, RRC activates

SP-SRS: RRC configures resource and spatial relation, MAC-CE activates

AP-SRS: RRC configures resource and spatial relation, MAC-CE updates spatial relation.

As discussed previously, existing beam management procedures lack efficient support for common beam switching during some deployment scenarios, such as high-speed movement scenarios, in which a large number of transmission configuration states may be configured in a situation in which one or more UEs are in motion. Existing beam management is deficient because of the use of separate downlink/uplink beam indication frameworks, different control and data beam indication and updating, as well as slow RRC and MAC-CE signaling for configuration, activation, and updating. In a common deployment, the beams used for the PDCCH, the PDSCH, the tracking reference signal (TRS), and the channel state information reference signal (CSI-RS) are the same beam. In some deployments, a beam correspondence requirement is defined for uplink/downlink in which uplink control and data may utilize the correspondence beam of the common downlink beam. However, existing beam management specifications lack efficient and simplified support for common beam implementations. For example, existing beam switching times for the PDCCH including beam measurement, MAC-CE signaling, and period TRS delay may total 15 ms which may be too slow for high mobility support. Embodiments described herein provide for more efficient beam management for situations in which a common beam is used for uplink and/or downlink data and control transmissions.

Referring again to the embodiment illustrated in FIG. 2, the first PDCCH 224 is configured for the UE 210 on a first control resource set (CORESET-1), and the second PDCCH 226 is configured for the UE 210 on a second CORESET (CORESET-SWT). Although FIG. 2 illustrates an embodiment in which the UE 210 is configured with a first PDCCH 224 and second PDCCH 226, each having corresponding CORESETs, it should be understood that the UE 210 may be configured with any number of PDCCHs. For example, the UE 210 may be configured with PDCCH-1 on CORESET 1, PDCCH-2 on CORESET-2, . . . , PDCCH-K on CORESET K, as well as the additional second PDCCH 226 on CORESET-SWT. In a particular embodiment, the second CORESET (CORESET-SWT) is configured to be time-division multiplexed (TDM) with the other CORESETs without time domain overlapping. In another particular embodiment, the second CORESET (CORESET-SWT) is configured to be overlapped with the first CORESET. In an initial state, a spatial quasi-colocation (QCL) in the TCI state of the second PDCCH 226 is uninitialized and subsequently dynamically updated based upon a UE beam measurement report as further described herein. Spatially quasi-collocated (QCL'd) refers to an access node transmitting different signals through similar beams.

In the embodiment of FIG. 2, the UE 210 performs a beam measurement on a set of downlink reference signals from the access node 205 and calculates a set of beam measurement quantities. The UE 210 sends a measurement report to the access node 205 consisting of a configurable number of the measurement quantities (or qualities described in this disclosure) with the largest values and the reference signal resource indicators corresponding to these reported measurement quantities, and starts to monitor the second PDCCH 226 if the best measurement quantity in the measurement report exceeds a threshold. In a particular embodiment, the network may send a set configuration (SET-SWT) along with the configuration of beam measurement reporting. The information in the set configuration instructs the UE 210 to include or exclude certain reference signals of beam measurement for determining the best measurement quantity. One example of the set configuration may be a bit mask, each bit of the bit mask corresponding to including or excluding a reference signal of beam measurement for determining the best measurement quantity. In an embodiment of monitoring the second PDCCH, the UE 210 assumes that the spatial QCL field of the TCI state of the second CORESET is set to the reference signal resource indicator corresponding to the best measurement quantity in the beam measurement report. In an embodiment of monitoring the second PDCCH, the UE 210 assumes that a demodulation reference signal (DMRS) of the second PDCCH is QCL with respect to receive (RX) spatial parameters to the reference signal corresponding to the best measurement quantity in the beam measurement report. In an embodiment of monitoring the second PDCCH, if the UE 210 detects a particular TCI bits field within a DCI message of the second PDCCH (PDCCH-SWT) 226, the UE 210 replaces a spatial QCL field in the TCI state of the first CORESET with the reference signal resource indicator corresponding to the best measurement quantity in the beam measurement report.

In the embodiment of FIG. 2, the UE 210 derives a metric based on the reference signal measurement quantities. In an embodiment of deriving metric, the UE 210 derives the metric by calculating the ratio of the beam measurement quantities. The network sends a set configuration (SET-SWT) along with the configuration of beam measurement reporting. The information in the set configuration instructs the UE 210 which beam measurement quantities to use in deriving the metric. One example of the set configuration may be a bit mask in which each bit corresponds to whether a particular beam measurement quantity of a reference signal should be included in the set for deriving the ratio's numerator. The rest of beam measurement quantities are not in the set and should be utilized for deriving the ratio's denominator. The UE 210 then selects the beam measurement quantity in the set with the largest values, divided by the beam measurement quality not in the set with the smallest value, to obtain the ratio as the metric. The UE 210 starts to monitor the second PDCCH 226 if the metric exceeds a threshold. In an embodiment of monitoring the second PDCCH, the UE assumes that the spatial QCL field of the TCI state of the second CORESET is set to the reference signal resource indicator corresponding to the reference signal beam measurement quantity upon which the metric is derived. In an embodiment of monitoring the second PDCCH, the UE 210 assumes that the DMRS of the second PDCCH is QCL with respect to RX spatial parameters to the reference signal upon its beam measurement quantity the metric is derived. In an embodiment of monitoring the second PDCCH, if the UE 210 detects a particular TCI bits field within a DCI message of the second PDCCH (PDCCH-SWT) 226, the UE 210 replaces a spatial QCL field in the TCI state of the first CORESET with the reference signal resource indicator corresponding to the reference signal beam measurement quantity upon which the metric is derived.

In the embodiment of FIG. 2, the UE 210 monitors the second PDCCH 226 during one or more configurable switching monitoring slots (SLOT-SWT). The configuration of SLOT-SWT may be pre-defined or signaled to the UE 210 with an RRC message. In the embodiment of FIG. 2, the threshold used in comparing to the best beam measurement quantity or metric is predefined or signaled to the UE 210 through RRC messages. The threshold may be dynamically updated from the network to the UE 210 by MAC-CE messages. In the embodiment of FIG. 2, the bit mask in the set configuration is predefined or signaled to the UE through RRC messages. The bit mask may be dynamically updated from the network to the UE by MAC-CE messages. In the embodiment of FIG. 2, the reported quantity in the beam measurement report is a Layer 1 (L1) Reference Signal Receive Power (RSRP) or an L1 signal-to-interference-plus-noise ratio (SINR).

In an example operation of communication system 200 of FIG. 2, a network has configured the UE 210 with a number of PDCCHs including PDCCH-1 on CORESET-1, PDCCH-2 on CORESET-2, . . . , PDCCH-K on CORESET-K. The network further configures an switching PDCCH-SWT on CORESET-SWT without configuring the spatial QCL field in the TCI state. The network further configures L1-RSRP or L1-SINR measurement reporting. The network configures one or more switching monitoring slots (SLOT-SWT). In a particular embodiment, the switching monitoring slots are defined as a downlink slots X occurring after the UE 210 sends its L1-RSRP/L1-SINR measurement report in an uplink.

Based on the measurement, the UE 210 determines a beam measurement metric (M-SWT) as a measure of relative beam quality between the best beam belonging to SET-SWT with the highest beam measurement quantity, and the worst beam not belonging to SET-SWT with the lowest quantity. If the metric (M-SWT) exceeds a switching threshold (T-SWT), then during the SLOT-SWT the UE 210 tries to detect a UE-specific DCI in PDCCH-SWT on CORESET-SWT. The spatial QCL field of TCI-SWT state of PDCCH-SWT is set to the downlink reference signal indicator corresponding to the beam measurement quantity upon which the numerator of M-SWT is obtained. In one or more embodiments, the resource indicator may be a CSI-RS Resource Indicator (CRI) or a SSB Resource Indicator (SSBRI). In a particular embodiment the switching threshold (T-SWT) is predefined. In another particular embodiment, the switching threshold (T-SWT) is configured by an RRC sent from the access node 105 to the UE 210.

If the UE-specific DCI is detected in PDCCH-SWT on CORESET-SWT during SLOT-SWT, the UE 210 may perform different actions depending on bit values found in the TCI-SWT field. If the bits in TCI-SWT are set to a value equal to zero (0), the UE 210 continues to receive PDCCH-SWT on CORESET-SWT and its scheduled PDSCH and downlink reference signals before the next beam measurement report is sent on the uplink. If the bits in TCI-SWT field are set to a value J, the UE 210 updates the spatial QCL field of TCI state of PDCCH-J on CORESET-J with the spatial QCL field of TCI-SWT state of PDCCH-SWT on CORESET-SWT. The UE 210 may be further configured to not monitor PDCCH-SWT on CORESET-SWT for the remaining downlink slots before the next beam measurement report is sent by the UE 210 on the uplink.

If the UE-specific DCI is not detected in PDCCH-SWT on CORESET-SWT during SLOT-SWT, the UE 210 is configured to not monitor PDCCH-SWT on CORESET-SWT for the remaining downlink slots before the next beam measurement report is sent by the UE 210 on the uplink. In one or more embodiments, the UE-anticipated common beam switching capability described herein may be dynamically activated and deactivated by the network through MAC-CE signaling or other signaling procedures. In one or more embodiments, the UE 210 may signal the network that the UE 210 supports the UE-anticipated common beam switching capability through a UE feature capability bit.

FIG. 3 illustrates a flow diagram of first example operations 300 occurring in a UE for UE-anticipated common beam switching according to example embodiments described herein. Operations 300 may be indicative of operations occurring in a UE, such as a physical layer entity of the UE, as the UE makes beam measurements and responds accordingly. The UE is configured by a base station, such as a gNB, with a first PDCCH having on a first CORESET and a switching PDCCH (PDCCH-SWT) on a switching CORESET (CORESET-SWT) (block 305). The base station configures the PDCCH-SWT on CORESET-SWT without configuring the spatial QCL field in the TCI state to PDCCH-SWT. Initially, the UE is not assumed to monitor the PDCCH-SWT until the base station sends a UE-anticipated common beam switching feature activation signal through RRC or MAC-CE and the UE begins to send beam measurement reports in the uplink. In one or more embodiments, the base station may deactivate the UE-anticipated common beam switching feature explicitly through RRC or MAC-CE signaling or implicitly through stopping the UE from sending beam measurement reports in the uplink.

The UE monitors the first PDCCH on the first CORESET, performs a beam measurement on one or more downlink reference signals, and sends beam measurement reports of the reference signals to the base station (block 307). The UE then determines whether it is within a switching monitoring slot (SLOT-SWT) (block 309). If the UE determines it is not within SLOT-SWT, the UE continues monitoring PDCCH within the first CORESET (block 307) until the next time to send beam measurement reports. If the UE determines that it is within SLOT-SWT, the UE computes a beam switching metric (M-SWT) based upon the reference signal beam measurement quantities and compares the M-SWT to a switching threshold (T-SWT) (block 311).

In one or more embodiments, the base station configures the calculation of M-SWT used by the UE from beam measurement quantities through RRC signaling. In an embodiment, the base station configures a bit for each resource to indicate how the resource should be used in the calculation of the M-SWT. For example, if a bit for a reference signal resource is set to a value=1, the beam measurement quantity associated with the reference signal resource is used to derive a denominator of M-SWT. If the bit for a reference signal resource is set to a value=0, the beam measurement quantity associated with the reference signal resource is used to derive a numerator of M-SWT.

In an embodiment, the UE may receive a MAC-CE signal from the base station during a connected mode to dynamically reconfigure the use of the L1 beam measurement result of the reference signal corresponding to each reference signal resource configured by RRC signaling. In an embodiment, the content of the MAC-CE may contain a bit mask in which each bit of the bit mask is associated with a reference signal resource. For example, if a bit within the bit mask for a resource is set to a value=1, the measurement result associated with it is used to device the denominator of M-SWT. If a bit within the bit mask for a resource is set to a value=0, the measurement result associated with the resource is used to derive the numerator of M-SWT.

In an example of deriving the M-SWT, the UE determines a quantity V1, which is the maximum value of all measurement quantities belonging to the resources within the same bit setting, e.g., bit 0. The UE then determines the quantity V2, which is the minimum value of all measurement quantities belonging to the resources with the other same bit betting, e.g., bit 1. In the example, M-SWT is calculated as V1/V2 or log(V1/V2) in a decibel (dB) scale. The computed M-SWT is compared with the switching threshold (T-SWT) which may be either predefined or configured through RRC signaling as previous described herein.

In an example in which all of the reference resources are configured to belong to the denominator, the UE may set V2=1 or only V1 is compared to T-SWT. As an example, assume a reported quantity is L1-RSRP and all of the resources are configured with bit 0. In such a case, V1 represents the best beam with the largest L1-RSRP quantity and is compared to T-SWT.

If M-SWT is not larger than T-SWT, the UE returns to block 309 to continue to determine if it in within SLOT-SWT. If M-SWT is greater than T-SWT, a beam has emerged as significantly stronger than a current beam used for control and data transmission, and the UE anticipates that the base station will make a decision to switch the current beam to the new beam. The UE starts to monitor PDCCH-SWT on CORESET-SWT with the assumption that the spatial QCL field in the TCI state will be set as the reference signal resource indicator upon its beam measurement quantity the M-SWT numerator is derived (block 313). During the SLOT-SWT, the UE continues to monitor the first PDCCH on the first CORESET and the PDCCH-SWT on the CORESET-SWT while also continuing to monitor other configured PDCHH(s) on other CORESET(s) (block 315).

The UE attempts to detect a UE-specific DCI in PDCCH-SWT on CORESET-SWT (block 317). If the UE is unable to detect the UE-specific DCI, the UE determines whether it is still within SLOT-SWT (block 319). If the UE is still within SLOT-SWT, the UE returns to block 315 to continue monitoring the PDCCHs on the CORESETs and PDCCH-SWT on CORESET-SWT (block 315). If the UE is unable to detect the UE-specific DCI and is no longer within the SLOT-SWT, the UE assumes that the base station will not switch the transmit beam and stops monitoring PDCCH-SWT on CORESET-SWT until the time to send the next beam measurement report in the uplink (block 321), and returns to block 307 to again begin monitoring the first PDCCH on the first CORESET.

If the UE detects the UE-specific DCI in PDCCH-SWT, the UE determines whether the TCI bit field is set to all zeros (block 323). If the TCI bit field is set to all zeros, the UE assumes that the base station will use PDCCH-SWT on CORESET-SWT to the transmit control channel and data channel with the spatial QCL field in the TCI state set to the reference signal resource indicator upon its beam measurement quantity the M-SWT numerator is derived, and that the base station will not replace any of the current configured PDCCH TCI states. The UE continues to monitor the first PDCCH on the first CORESET and the PDCCH-SWT on CORESET-SWT until the next beam measurement report is sent in the uplink (block 329). In this way, transmission of the control and data channel may take advantage of a strong beam state more dynamically. The UE determines whether the next uplink measurement reporting time has arrived (block 331). If the next uplink measurement reporting time has not arrived, the UE returns to block 329 to continue monitoring the first PDCCH on the first CORESET and the PDCCH-SWT on CORESET-SWT. If the next uplink measurement reporting time has arrived, the UE stops monitoring the PDCCH-SWT one the CORESET-SWT (block 333) and returns to block 307 to again begin monitoring the first PDCCH on the first CORESET.

If the UE detects that the TCI bit field in the UE-specific DCI in PDCCH-SWT is set to nonzero value (TCI=j), the UE determines that the base station indicates to the UE to replace the spatial QCL filed in the TCI state of CORESET-J with the spatial field in the TCI state of CORESET-SWT. The UE replaces the spatial QCL filed in the TCI state of CORESET-J with the spatial QCL field in the TCI state of CORESET-SWT, and sets the CORESET-SWT spatial QCL field in the TCI state to none (or NULL) (block 325). The UE stops monitoring PDCCH-SWT on CORESET-SWT (block 327), and returns to block 307 to again begin monitoring the first PDCCH on the first CORESET.

FIG. 4 illustrates a flow diagram of example operations 400 occurring in a base station for UE-anticipated common beam switching according to example embodiments described herein. Operations 400 may be indicative of operations occurring in a base station, such as a physical layer entity of the base station, as the base station receives beam measurement reports from a UE and responds accordingly. The base station configures the UE with a first PDCCH having on a first CORESET and a switching PDCCH (PDCCH-SWT) on a switching CORESET (CORESET-SWT). The base station configures the PDCCH-SWT on the CORESET-SWT without setting the spatial QCL field in the TCI state of CORESET-SWT. The base station transmits the first PDCCH on the first CORESET to the UE (block 405).

The base station determines whether a new uplink measurement report has been received from the UE (block 407). If no new measurement report has been received from the UE, the base station returns to block 405. If the base station determines that a new uplink measurement report has been received from the UE, the base station removes the PDCCH-SWT on the CORESET-SWT from the set of PDCCHs containing the first PDCCH on the first CORESET (block 409). In an embodiment, the uplink measurement report contains an indication of whether a metric (M-SWT) based upon reference signal beam measurement quantities by the UE is greater than the switching threshold (T-SWT).

The base station determines whether M-SWT is greater than T-SWT based upon the indication received in the uplink measurement report (block 411). If M-SWT is greater than T-SWT, the base station determines whether to switch the PDCCH-SWT on CORESET-SWT with the PDCCH-J on CORESET-J, where PDCCH-J is a current PDCCH determined as a potential candidate to replace by PDCCH-SWT (block 413). If the base station determines to switch the PDCCH-SWT on CORESET-SWT with the PDCCH-J on CORESET-J, the base station transits the PDCCH-SWT on CORESET-SWT to the UE with the TCI state (TCI bits=j) set to that of (PDCCH-J) (block 415). The base station determines whether an uplink acknowledgement (ACK) or negative acknowledgment (NACK) has been received from the UE (block 417).

If an uplink ACK or NACK has not been received from the UE, the base station determines whether the UE is within a switching monitoring slot (SLOT-SWT) (block 419). If the base station determines that the UE is within the SLOT-SWT, the base station returns to block 415. If the base station determines that the UE is not within SLOT-SWT, the base station returns to block 405. If an uplink ACK or NACK has been received from the UE, the base station switches the PDCCH-SWT on CORESET-SWT with the PDCCH-J on CORESET-J (block 421), and returns to block 405.

If the base station decides to not switch PDCCH-SWT on CORESET-SWT with PDCCH-J on CORESET-J, the base station transmits the PDCCH-SWT on CORESET-SWT with the TCI bits set to zero (block 423). The base station determines whether an uplink ACK or NACK has been received from the UE (block 425).

If an uplink ACK or NACK has not been received from the UE, the base station determines whether the UE is within SLOT-SWT (block 427). If the base station determines that the UE is within the SLOT-SWT, the base station returns to block 423. If the base station determines that the UE is not within SLOT-SWT, the base station returns to block 405. If the base station determines that an uplink ACK or NACK has been received, the base station adds the PDCCH-SWT on CORESET-SWT into the set containing the first PDCCH on the first CORESET and returns to block 405.

Figures 5, 6:
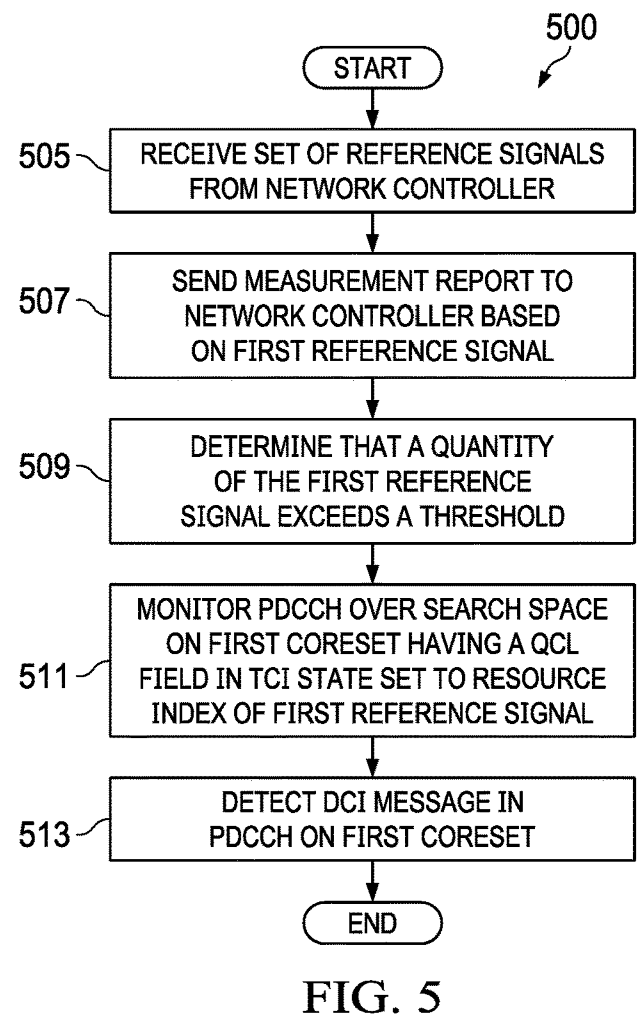
FIG. 5 illustrates a flow diagram of second example operations occurring in a UE for UE-anticipated common beam switching according to example embodiments described herein.
FIG. 6 illustrates an example communication system according to example embodiments described herein.

FIG. 5 illustrates a flow diagram of second example operations 500 occurring in a UE for UE-anticipated common beam switching according to example embodiments described herein. Operations 500 may be indicative of operations occurring in a UE, such as a physical layer entity of the UE, as the UE makes beam measurements and responds accordingly.

A UE receives a set of reference signals from a network controller, such as a network controller associated with a base station (block 505). The UE sends a measurement report to the network controller based on a first reference signal of the received reference signals (block 507). The UE determines that a quantity of the first reference signal reported in the measurement report exceeds a threshold (block 509). In an embodiment, the threshold used to compare to the quantity in the measurement report is a Reference Signal Receive Power (RSRP). In another embodiment, the threshold used to compare to the quantity in the measurement report is a Signal to Interference plus Noise Ratio (SINR).

Based on the quantity of the first reference signal exceeding the threshold, the UE monitors a physical downlink control channel (PDCCH) over a search space on a first control resource set (CORESET) (block 511). A spatial quasi-colocation (QCL) field in a transmission configuration indication (TCI) state of the first CORESET is set to a resource index of the first reference signal.

For beam management a set of reference signals are configured for transmitting by the network. The configuration is performed by configuring a set of resources of reference signals, e.g., time and frequency locations. Each resource can be indexed by a resource index. The UE performs the measurement and reports the resource indexes of the best reference signal beams. When the network instructs the UE to receive a particular signal with a certain receive direction (beam), the network indicates to the UE the resource index in the TCI state. The UE will apply the same receive filter for receiving the reference signal corresponding to the indicated resource index.

The UE detects a downlink control information (DCI) message in the PDCCH over the search space on the first CORESET (block 513). In an embodiment, the DCI message instructs the UE to receive a physical downlink data channel (PDSCH). A spatial QCL field in a TCI state of the PDSCH is set to the resource index of the first reference signal. In an embodiment, the UE stops monitoring the PDCCH over the search space on the first CORESET responsive to the UE failing to detect a DCI message within a number of slots. In an embodiment, the number of slots is predefined. In another embodiment, the number of slots is configured through a RRC message. In another embodiment, the number of slots is updated through a MAC-CE message.

In another embodiment, the UE detects a TCI bits field in the DCI message in the PDCCH on the first CORESET. The TCI bits field instructs the UE to replace a spatial QCL field in a TCI state of a second CORESET with the spatial QCL field in the TCI state of the first CORESET. The UE then replaces in response to receiving the TCI bits field in the DCI message, the spatial QCL field in the TCI state of the second CORESET with the spatial QCL field of the TCI state of the first CORESET.

In another embodiment, the UE monitors the PDCCH over the search space on the first CORESET, and a demodulation reference signal (DMRS) of the PDCCH is quasi-co-located with respect to receive (RX)) spatial parameters of the first reference signal. In another embodiment, the DCI message detected by the UE in the PDCCH over the search space on the first CORESET instructs the UE to receive a PDSCH, wherein a DMRS of the PDSCH is quasi-co-located (QCL) with respect to RX spatial parameters of the first reference signal.

In an embodiment, the UE is initially configured with the first CORESET without the spatial QCL field being set, and the UE is not configured to monitor the PDCCH over the search space on the first CORESET. In another embodiment, the UE is initially configured with the first CORESET with the spatial QCL field set to a NULL value, and the UE is not configured to monitor the PDCCH over the search space on the first CORESET.

In an embodiment, a threshold value of the threshold is predefined. In another embodiment, the threshold is configured through a radio resource control (RRC) message. In another embodiment, the threshold is updated through a medium access control-control element (MAC-CE) message.

In an embodiment, the UE is configured to monitor the PDCCH over the search space on the first CORESET, and the spatial QCL field in the TCI state of the first CORESET is set to the resource index of the first reference signal. In an embodiment, the threshold is not configured, the UE is configured to monitor the PDCCH over the search space on the first CORESET, and the DMRS of the PDCCH is quasi-co-located with respect to spatial QCL information of the first reference signal.

FIG. 6 illustrates an example communication system 600. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 600 includes electronic devices (ED) 610*a*-610*c*, radio access networks (RANs) 620*a*-620*b*, a core network 630, a public switched telephone network (PSTN) 640, the Internet 650, and other networks 660. While certain numbers of these components or elements are shown in FIG. 6, any number of these components or elements may be included in the system 600.

The EDs 610*a*-610*c* are configured to operate or communicate in the system 600. For example, the EDs 610*a*-610*c* are configured to transmit or receive via wireless or wired communication channels. Each ED 610*a*-610*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 620*a*-620*b* here include base stations 670*a*-670*b*, respectively. Each base station 670*a*-670*b* is configured to wirelessly interface with one or more of the EDs 610*a*-610*c* to enable access to the core network 630, the PSTN 640, the Internet 650, or the other networks 660. For example, the base stations 670*a*-670*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 610*a*-610*c* are configured to interface and communicate with the Internet 65*o* and may access the core network 630, the PSTN 640, or the other networks 660.

In the embodiment shown in FIG. 6, the base station 670*a* forms part of the RAN 620*a*, which may include other base stations, elements, or devices. Also, the base station 670*b* forms part of the RAN 620*b*, which may include other base stations, elements, or devices. Each base station 670*a*-670*b* operates to transmit or receive wireless signals within a particular geographic region or area, sometimes referred to as a "cell." In some embodiments, multiple-input multiple-output (MIMO) technology may be employed having multiple transceivers for each cell.

The base stations 670*a*-670*b* communicate with one or more of the EDs 610*a*-610*c* over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 620*a*-620*b* are in communication with the core network 630 to provide the EDs 610*a*-610*c* with voice, data, application, Voice over Internet Protocol (VoIP), or other services. Understandably, the RANs 620*a*-620*b* or the core network 630 may be in direct or indirect communication with one or more other RANs (not shown). The core network 630 may also serve as a gateway access for other networks (such as the PSTN 640, the Internet 650, and the other networks 660). In addition, some or all of the EDs 610*a*-610*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

FIGS. 7 and 8 illustrate example devices that may implement the methods and teachings according to this disclosure. In particular, FIG. 7 illustrates an example ED 710, and FIG. 8 illustrates an example base station 770. These components could be used in the system 600 or in any other suitable system.

As shown in FIG. 7, the ED 710 includes at least one processing unit 700. The processing unit 700 implements various processing operations of the ED 710. For example, the processing unit 700 could perform signal coding, data processing, power control, input/output processing, or any other functionality enabling the ED 710 to operate in the system 700. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 710 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver YYY02 includes any suitable structure for generating signals for wireless or wired transmission or processing signals received wirelessly or by wire. Each antenna 704 includes any suitable structure for transmitting or receiving wireless or wired signals. One or multiple transceivers 702 could be used in the ED 710, and one or multiple antennas 704 could be used in the ED 710. Although shown as a single functional unit, a transceiver 702 could also be implemented using at least one transmitter and at least one separate receiver.

The ED 710 further includes one or more input/output devices 706 or interfaces (such as a wired interface to the Internet 650). The input/output devices 706 facilitate interaction with a user or other devices (network communications) in the network. Each input/output device 706 includes any suitable structure for providing information to or receiving information from a user, such as a speaker, microphone, keypad, keyboard, display, or touch screen, including network interface communications.

In addition, the ED 710 includes at least one memory 708. The memory 708 stores instructions and data used, generated, or collected by the ED 710. For example, the memory 708 could store software or firmware instructions executed by the processing unit(s) 700 and data used to reduce or eliminate interference in incoming signals. Each memory 708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8, the base station 770 includes at least one processing unit 750, at least one transceiver 752, which includes functionality for a transmitter and a receiver, one or more antennas 756, at least one memory 758, and one or more input/output devices or interfaces 766. A scheduler, which would be understood by one skilled in the art, is coupled to the processing unit 750. The scheduler could be included within or operated separately from the base station 770. The processing unit 750 implements various processing operations of the base station 770, such as signal coding, data processing, power control, input/output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more EDs or other devices. Each transceiver 752 further includes any suitable structure for processing signals received wirelessly or by wire from one or more EDs or other devices. Although shown combined as a transceiver 752, a transmitter and a receiver could be separate components. Each antenna 756 includes any suitable structure for transmitting or receiving wireless or wired signals. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile or non-volatile storage and retrieval device(s). Each input/output device 766 facilitates interaction with a user or other devices (network communications) in the network. Each input/output device 766 includes any suitable structure for providing information to or receiving/providing information from a user, including network interface communications.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse, keyboard, or printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. A signal may be monitored by a monitoring unit or a monitoring module. A signal may be detected by a detecting unit or a detecting module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:

receiving, by a user equipment (UE), a set of reference signals from a network controller;

sending, by the UE, a measurement report to the network controller based on a first reference signal of the set of reference signals; and in response to the UE determining that a measurement quantity of the first reference signal exceeds a threshold, monitoring, by the UE based on a resource index of the first reference signal, a physical downlink control channel (PDCCH) over a search space on a first control resource set (CORESET), a spatial quasi-colocation (QCL) field in a transmission configuration indication (TCI) state of the first CORESET being set to the resource index of the first reference signal, the monitoring the PDCCH comprising:

monitoring, by the UE, the PDCCH over the search space on the first CORESET, a demodulation reference signal (DMRS) of the PDCCH being quasi-co-located with respect to receive (RX) spatial parameters of the first reference signal.

2. The method of claim 1, further comprising:

detecting, by the UE, a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

3. The method of claim 1, wherein the UE stops monitoring the PDCCH over the search space on the first CORESET responsive to the UE failing to detect a DCI message within a number of slots.

4. The method of claim 3, wherein the number of slots is updated through a MAC-CE message.

5. The method of claim 1, further comprising:

detecting, by the UE, a TCI bits field in a DCI message in the PDCCH on the first CORESET, the TCI bits field instructing the UE to replace a spatial QCL field in a TCI state of a second CORESET with the spatial QCL field in the TCI state of the first CORESET; and replacing, by the UE in response to receiving the TCI bits field in the DCI message, the spatial QCL field in the TCI state of the second CORESET with the spatial QCL field of the TCI state of the first CORESET.

6. The method of claim 1, further comprising:

detecting, by the UE, a DCI message in the PDCCH over the search space on the first CORESET, the DCI message instructing the UE to receive a PDSCH, a second DMRS of the PDSCH being quasi-co-located with respect to RX spatial parameters of the first reference signal.

7. The method of claim 1, wherein the UE is initially configured with the first CORESET without the spatial QCL field being set, and the UE is not configured to monitor the PDCCH over the search space on the first CORESET.

8. The method of claim 1, wherein the UE is initially configured with the first CORESET with the spatial QCL field set to a NULL value, and the UE is not configured to monitor the PDCCH over the search space on the first CORESET.

9. The method of claim 1, wherein the threshold is updated through a medium access control-control element (MAC-CE) message.

10. The method of claim 1, wherein the UE is configured to monitor the PDCCH over the search space on the first CORESET, the spatial QCL field in the TCI state of the first CORESET being set to the resource index of the first reference signal.

11. The method of claim 1, wherein the threshold is not configured, and the UE is configured to monitor the PDCCH over the search space on the first CORESET, a demodulation reference signal (DMRS) of the PDCCH being quasi-co-located with respect to spatial QCL information of the first reference signal.

12. The method of claim 1, wherein the threshold used to compare to the measurement quantity in the measurement report is a Reference Signal Receive Power (RSRP) or a Signal to Interference plus Noise Ratio (SINR).

13. A user equipment (UE) comprising:

a non-transitory memory storage comprising instructions; and one or more processors in communication with the non-transitory memory storage, wherein the one or more processors execute instructions to cause the UE to perform operations including:

receiving a set of reference signals from a network controller;

sending a measurement report to the network controller based on a first reference signal of the set of reference signals; and in response to the UE determining that a measurement quantity of the first reference signal reported in the measurement report exceeds a threshold, monitoring a physical downlink control channel (PDCCH) over a search space on a first control resource set (CORESET) based on a resource index of the first reference signal, a spatial quasi-colocation (QCL) field in a transmission configuration indication (TCI) state of the first CORESET being set to the resource index of the first reference signal, the monitoring the PDCCH comprising:

monitoring, by the UE, the PDCCH over the search space on the first CORESET, a demodulation reference signal (DMRS) of the PDCCH being quasi-co-located with respect to receive (RX) spatial parameters of the first reference signal.

14. The UE of claim 13, the operations further including:

detecting a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

15. The UE of claim 13, the operations further including:

stopping monitoring the PDCCH over the search space on the first CORESET responsive to the UE failing to detect a DCI message within a number of slots.

16. The UE of claim 13, the operations further including:

detecting a TCI bits field in a DCI message in the PDCCH on the first CORESET, the TCI bits field instructing the UE to replace a spatial QCL field in a TCI state of a second CORESET with the spatial QCL field in the TCI state of the first CORESET; and replacing, in response to receiving the TCI bits field in the DCI message, the spatial QCL field in the TCI state of the second CORESET with the spatial QCL field in the TCI state of the first CORESET.

17. The UE of claim 13, the operations further including:

detecting, a DCI message in the PDCCH over the search space on the first CORESET, the DCI message instructing the UE to receive a PDSCH, a second DMRS of the PDSCH being quasi-co-located with respect to RX spatial parameters of the first reference signal.

18. A non-transitory computer-readable medium storing computer instructions, that when executed by a user equipment (UE), cause the UE to perform operations including:

receiving a set of reference signals from a network controller;

sending a measurement report to the network controller based on a first reference signal of the set of reference signals; and in response to the UE determining that a measurement quantity of the first reference signal reported in the measurement report exceeds a threshold, monitoring a physical downlink control channel (PDCCH) over a search space on a first control resource set (CORESET) based on a resource index of the first reference signal, a spatial quasi-colocation (QCL) field in a transmission configuration indication (TCI) state of the first CORESET being set to the resource index of the first reference signal, the monitoring the PDCCH comprising:

monitoring, by the UE, the PDCCH over the search space on the first CORESET, a demodulation reference signal (DMRS) of the PDCCH being quasi-co-located with respect to receive (RX) spatial parameters of the first reference signal.

19. The non-transitory computer-readable medium of claim 18, the operations further including:

detecting a downlink control information (DCI) message in the PDCCH over the search space on the first CORESET, the DCI message instructing the UE to receive a physical downlink data channel (PDSCH), a spatial QCL field in a TCI state of the PDSCH being set to the resource index of the first reference signal.

20. The non-transitory computer-readable medium of claim 18, the operations further including:

detecting a TCI bits field in a DCI message in the PDCCH on the first CORESET, the TCI bits field instructing the UE to replace a spatial QCL field in a TCI state of a second CORESET with the spatial QCL field in the TCI state of the first CORESET; and replacing, in response to receiving the TCI bits field in the DCI message, the spatial QCL field in the TCI state of the second CORESET with the spatial QCL field in the TCI state of the first CORESET.

* * * * *